US009284945B2

(12) United States Patent
Brendle et al.

(10) Patent No.: US 9,284,945 B2
(45) Date of Patent: Mar. 15, 2016

(54) WIND TURBINE AND TOWER SYSTEM (71) Applicants: Douglas Brendle, Cheyenne, WY (US); Stephen N. Brinkerhoff, Cheyenne, WY (US)

(72) Inventors: Douglas Brendle, Cheyenne, WY (US); Stephen N. Brinkerhoff, Cheyenne, WY (US)

(*) Notice: Subject to any disclaimer, the term of this patent is extended or adjusted under 35 U.S.C. 154(b) by 0 days.

(21) Appl. No.: 14/422,327

(22) PCT Filed: Mar. 15, 2014

(86) PCT No.: PCT/IB2014/059859
§ 371 (c)(1),
(2) Date: Feb. 18, 2015

(87) PCT Pub. No.: WO2014/141214
PCT Pub. Date: Sep. 18, 2014

(65) Prior Publication Data
US 2015/0211483 A1  Jul. 30, 2015

Related U.S. Application Data

(60) Provisional application No. 61/801,104, filed on Mar. 15, 2013.

(51) Int. Cl.
*F03D 3/06* (2006.01)
*F03D 7/06* (2006.01)
*F03D 3/02* (2006.01)
(Continued)

(52) U.S. Cl.
CPC .............. *F03D 3/061* (2013.01); *F03D 3/005* (2013.01); *F03D 3/02* (2013.01); *F03D 3/0454* (2013.01); *F03D 3/065* (2013.01); *F03D 7/06* (2013.01); *F03D 9/002* (2013.01); *Y02E 10/74* (2013.01)

(58) Field of Classification Search
CPC ........... F03D 3/005; F03D 3/06; F03D 3/061; F03D 7/06
See application file for complete search history.

(56) References Cited

U.S. PATENT DOCUMENTS

| 387,424 A | * | 8/1888 | Koeppe | ..................... F03D 3/00 415/4.2 |
| 537,494 A | * | 4/1895 | Stevens | ..................... F03B 3/00 415/164 |

(Continued)

OTHER PUBLICATIONS

International Search Report and Written Opinion of the International Searching Authority dated Aug. 27, 2014 in parent case PCT/IB2014/059859.

*Primary Examiner* — Dwayne J White
*Assistant Examiner* — Joshua R Beebe
(74) *Attorney, Agent, or Firm* — Polson Intellectual Property Law, PC; Margaret Polson (57) ABSTRACT

The disclosed wind turbine utilizes adjustable blades, forcing wind into channels away from the rotational axis. These channels direct wind to conversion surfaces a desirable distance from the rotational axis of the turbine, producing more torque. The channels feature independent exhaust points and intake points, minimizing vortices within the blades that can reduce torque. The blades of the disclosed turbine overlap, creating a larger constant percentage of air flow into the turbine channel. A modular tower for mounting a wind turbine is also disclosed. Finally, a wind directional amplifier for use with a wind turbine is disclosed. The wind directional amplifier directs the flow of wind to the optimum location for capture surfaces. When used with multiple wind turbines, the wind directional amplifier may be used to focus more or less air flow to one or more turbines, thereby selectively controlling the output of all the turbines collectively.

34 Claims, 9 Drawing Sheets

(51) Int. Cl.
*F03D 3/04* (2006.01)
*F03D 3/00* (2006.01)
*F03D 9/00* (2006.01)

(56) References Cited

U.S. PATENT DOCUMENTS

| | | | | |
|---|---|---|---|---|
| 1,787,072 | A * | 12/1930 | Henderson | F03D 7/06 416/138 |
| 4,005,947 | A * | 2/1977 | Norton | F03D 3/007 416/197 A |
| 4,359,311 | A * | 11/1982 | Benesh | F03D 3/061 416/197 A |
| 4,362,470 | A * | 12/1982 | Locastro | F03D 3/061 416/197 A |
| 4,684,817 | A | 8/1987 | Goldwater | |
| 6,283,711 | B1 * | 9/2001 | Borg | F03D 3/065 416/135 |
| 6,448,669 | B1 * | 9/2002 | Elder | F03D 3/0409 290/43 |
| 2004/0036297 | A1 | 2/2004 | John | |
| 2004/0265116 | A1 * | 12/2004 | Kaneda | F03D 3/0409 415/4.2 |
| 2009/0246027 | A1 * | 10/2009 | Johnson | F03D 3/005 416/197 A |
| 2010/0001525 | A1 * | 1/2010 | Yang | F03D 3/005 290/44 |
| 2011/0089698 | A1 | 4/2011 | Ahmadi | |
| 2011/0206526 | A1 * | 8/2011 | Roberts | F03D 3/02 416/223 R |
| 2011/0280707 | A1 | 11/2011 | Iskrenovic | |
| 2012/0159875 | A1 | 6/2012 | Meyer et al. | |

* cited by examiner

WIND TURBINE AND TOWER SYSTEM

CROSS REFERENCE APPLICATIONS

This application claims the benefit of U.S. provisional application No. 61/801,104 filed Mar. 15, 2013, which is hereby incorporated by reference in its entirety for all purposes.

BACKGROUND

Wind turbines have been around for several hundred years. Initially, these devices were used to grind grains or to move surface water, then to pump water from underground aquifers. A few decades ago, technology advanced to the point that wind turbines were being used to drive generators and alternators for the production of electricity. Commercial (large scale) wind farms are now quite common around the globe. This technology has since found its way into the residential (small scale) applications. Until recently, horizontal axis wind turbines (HAWTs) were the only platforms being developed. Now, several styles of vertical axis wind turbines (VAWTs) are being manufactured.

Over the last several decades, the major improvements of the horizontal platforms have been limited to the materials used in manufacturing and the generators and alternators. The basic design of the horizontal platform turbine blades has not changed. The challenge in the wind turbine industry has always been to create more positive force than negative force on the opposing blades or fins of the turbine.

Currently available products, while evolving, are lacking in several ways. Existing HAWT and VAWT platforms require a large footprint. Existing HAWT and VAWT platforms have negative environmental impacts such as noise pollution, wildlife hazards and aesthetic issues. However, the greatest problem with existing HAWT and VAWT platforms is the passive nature of the designs. Generally, when wind encounters a turbine, there are three possible outcomes: (1) the wind is captured; (2) the wind is shed; or (3) the wind has a neutral impact. If the wind is captured, it can have either a positive impact, turning the blades and activating the generator, or a negative impact, pushing the blades in the opposing direction and affecting the ability of the turbine to rotate in a positive direction.

Existing HAWT and VAWT platforms do not direct wind. Rather, existing designs allow wind to make contact with the capture blades and the shed or neutral blades at the same time. The wind impact on the shed and neutral blades can generate momentary negative force to the shaft that turns the blade in the opposite of the desired direction. This negative force fights against the positive force and desired rotational direction, which in turn diminishes the speed and torque potential of the turbine as a whole and creates a pulsing affect in the rpm speed and energy production levels. Typical VAWTs create positive and negative forces that are initially equal in exposure. During rotation, VAWT blades move into positions around the axis that create more negative force exposure and potential on the shed side than positive. When transitioning from the equal exposure to the greater negative exposure the fins on each side of rotation axis fight against each other to turn the turbine in two different directions, creating a pulsing affect in energy production. The capture side exposure is increased by its shape, which captures more wind than it deflects, and the shed side deflects more air than it captures, thereby forcing the turbine to turn in the positive direction. But as long as the shed side creates momentary or constant capture surfaces in the shed position, an ever-present choking or braking affect is created. This braking affect reduces the potential of positive forces and directional speed (rpms), thereby limiting the production of power from the typical VAWT. The transition between more and less negative forces creates the fast and slow pulsing actions of the turbine head in a constant wind speed.

These characteristics of typical VAWTs limit the production of converted torque and power, slowing down the acceptance and application of VAWTs as viable energy alternatives compared to HAWT systems. Currently both VAWT and HAWT turbines must be very large in size to produce a viable level of torque to turn a large generator and therefore are very demanding on the environment, both by creating large footprints and by having unacceptable aesthetic values.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The disclosed wind turbine produces more torque at a smaller size, at lower wind speeds, has a positive aesthetic appeal, produces little to no noise and poses no noticeable wildlife danger. The disclosed wind turbine utilizes adjustable blades to force wind into channels away from the rotational axis. These channels direct the wind to conversion surfaces a desirable distance from the rotational axis of the turbine, producing more leverage and torque. The channels also direct wind to an exhaust point separate from the intake point, minimizing vortices within the blades that can reduce torque. The channels are adjustable, allowing control over the speed at which the turbine turns without braking.

A turbine according to the present disclosure may also include controls to automatically adjust the intake and exhaust openings based upon external wind speed, thereby reducing the potential for damage to the turbine and/or generator at high wind speeds. The controls may also be programmed to monitor wind speeds and make automatic adjustments to the intake and exhaust openings to maintain a more constant turbine rpm.

The configuration of the blades on the turbine head also contributes to its effectiveness. The blades overlap in a manner that creates a larger constant percentage of capture directed wind and air flow into the turbine channels than there is shedding surface(s) at any given position of the turbine head rotation around the axis. The blades are also shaped to decrease the amount of negative force counter-rotating the blades. In short, a turbine according to the present description maximizes wind capture while minimizing negative pressure.

A tower for mounting a wind turbine is also disclosed. The disclosed tower is designed to house a generator or alternator at ground level. The tower includes a universal bolt pattern for mounting a generator or alternator such that a variety of sizes and brands can be used with the disclosed tower. The tower is modular, allowing the height to be increased or decreased as necessary. It is designed to retrofit solar panels and it can be manufactured with built-in ladders that can be enclosed when not in used and locked to control access.

A wind directional amplifier for use with a wind turbine is also disclosed. The wind directional amplifier directs the flow of wind to the optimum location for capture surfaces. The wind directional amplifier can be mounted on the ground as a wall-like structure. It may also be mounted on a tower. A wind directional amplifier according to the present disclosure can be used with multiple wind turbines. When used with multiple wind turbines, the wind directional amplifier may be used to focus more or less air flow to one or more turbines, thereby selectively controlling the output of all the turbines collectively. Incorporating a wind directional amplifier allows turbines to be placed inside a building. The wind directional amplifier is stationary, and is controlled via adjustable louvers. These louvers can be manually controlled or electronically manipulated to increase or decrease the rotation of the wind turbines and torque generated, and can ultimately be used to maintain a constant rotation speed and torque regardless of the outside wind speeds. The louvers can be closed to shut off all air flow to the turbine, stopping the turbine completely, regardless of the outside wind speeds.

The wind directional amplifier, too, can be profiled, or externally shaped, and powder coated to compliment the surroundings. The inside or exhaust side of the amplifier can be filtered with a screening material to protect the turbine from impact from flying debris or wildlife, as well as creating a safety barrier that does not allow unauthorized access into the turbine area for people or animals.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
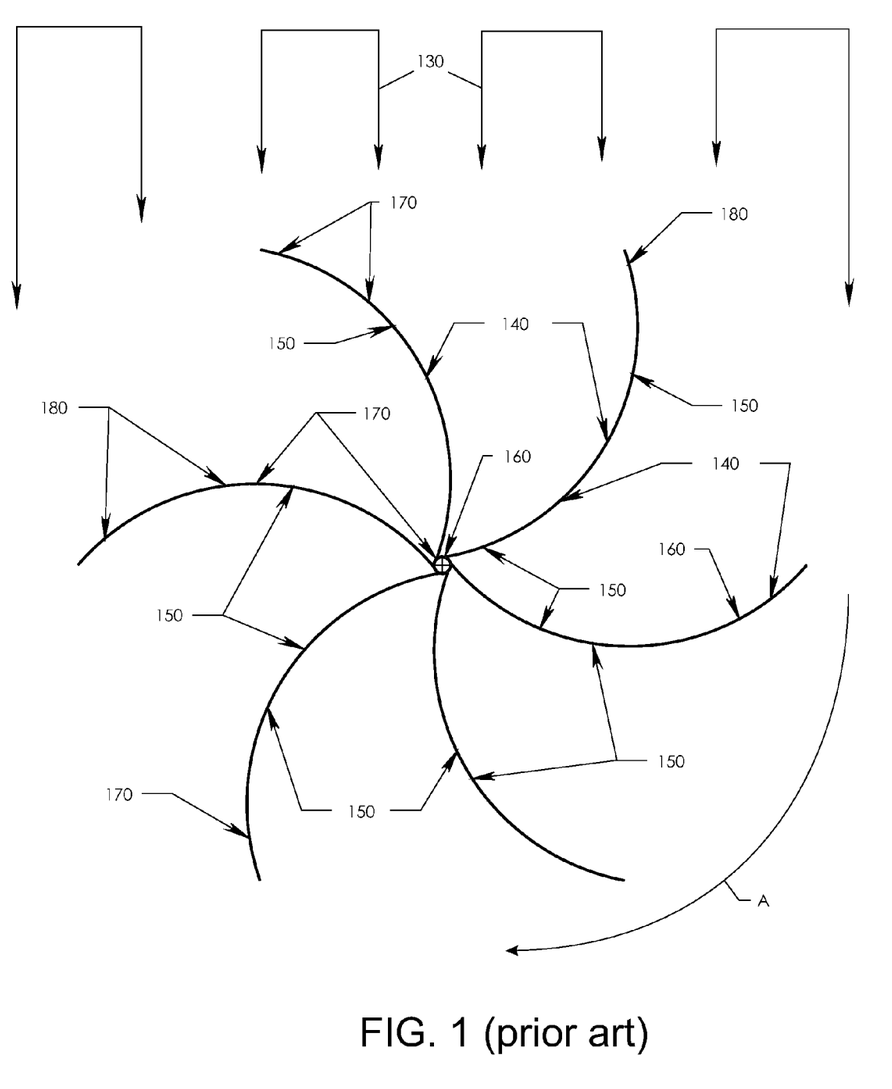
FIG. 1 is a front plan view of a typical prior art vertical turbine.
Figure 2:
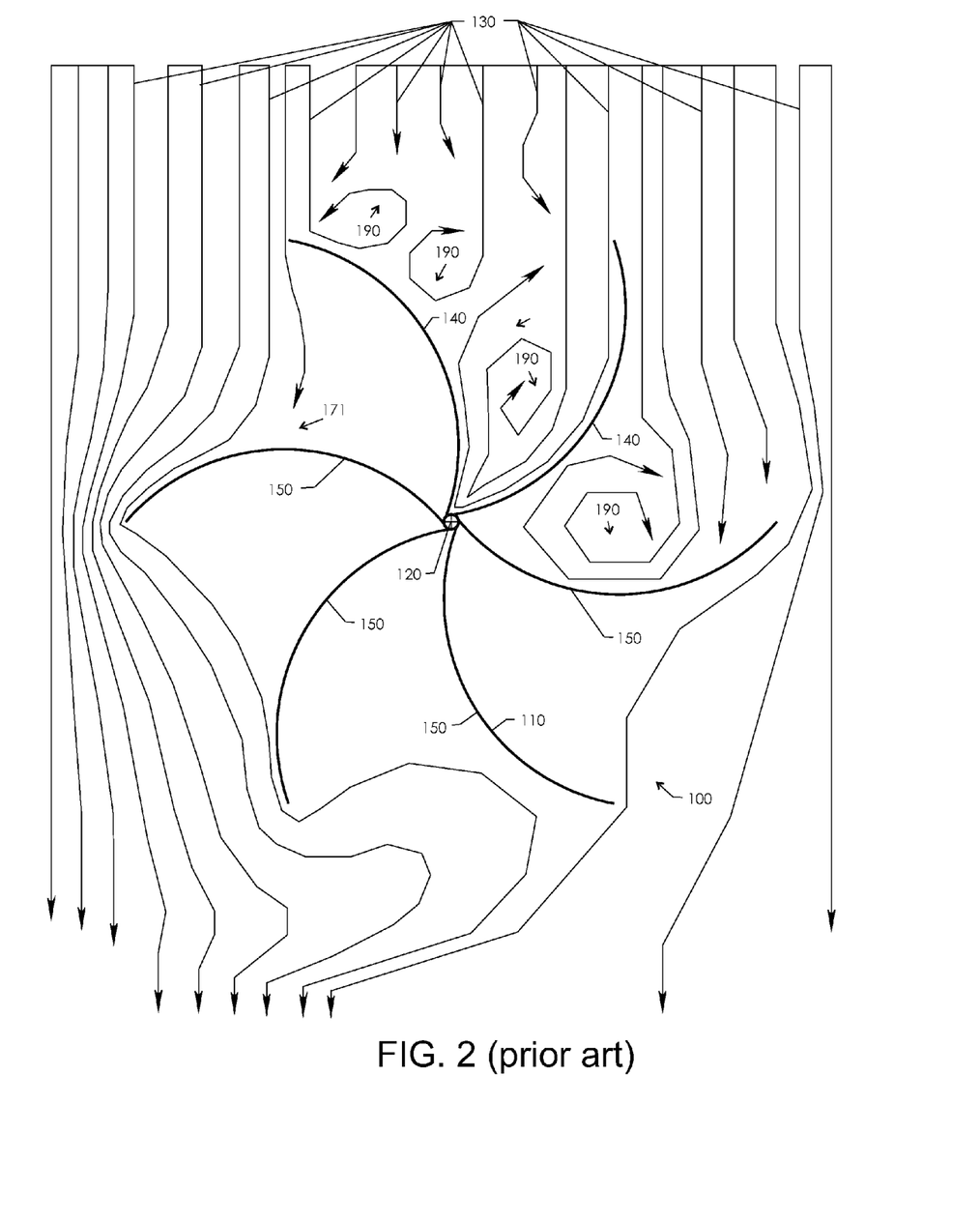
FIG. 2 is a front plan view of the wind path around the turbine of FIG. 1.

Turning first to FIGS. 1 and 2, a typical, prior art vertical turbine 100 is shown. Typical vertical turbine 100 includes blades 110 attached around axial shaft 120. Lines 130 demonstrate incoming wind. Arrow A shows the direction of rotation of blades 110 around the axial shaft. Incoming wind 130 impacts the blades 110 in a number of ways. First, the wind may be shed, meaning that it passes around blades 110 of turbine 100. Second, the wind may be captured between blades 110. Blades 110 include capture surfaces 140. Captured wind may have a positive impact, turning typical vertical turbine 100 and the generator powered by typical vertical turbine 100. Captured wind may also have a negative impact, trying to turn blades 110 in the opposite direction and thereby impacting output to the generator powered by typical wind turbine 100. Finally, the wind may have a neutral impact, meaning that it is not captured by blades 110. Blades 110 also include neutral surfaces 150. The surfaces change from one type of surface to another and back as they rotate and in different locations around axial shaft 120.

FIG. 1 demonstrates the areas of positive impact 160 and negative impact 170 on typical vertical turbine 100. The design is such that the force of the wind contacts capture surfaces 140, thereby creating positive impact 160 while also allowing the negative force 171 to pass around the other side of typical vertical turbine 100, or through and around shed surfaces 180, thereby creating negative impact 170. Further, positive impact 160 is directed near hub 120, which reduces the impact point to the axis between capture surfaces 140 and hub 120, producing very little leverage. Thus, only a fraction of the wind's potential is converted to energy or torque. Typically blades 110 meet the incoming wind and gently curve its direction inward flowing freely inward and toward the center axis or the axial shaft 120 producing very little torque. Negative impact 170 pushes shed surfaces 180 in the opposite direction desired, which fights against positive impact 160 and desired rotational direction diminishing the speed and torque potential of typical vertical turbine 100 as a whole, which creates a pulsing affect in the rotational speed and energy production levels. Typical VAWTs create positive and negative forces that are momentarily equal in exposure at best but while rotating move into positions around the axis that create more negative impact 170 on the shed surfaces 180 than positive impact 160 on the capture surfaces 140, and when transitioning from the equal exposure to the greater negative exposure the pulsing affect is realized as the blades 110 on each side of rotation axis fight against each other to turn typical vertical turbine 100 in two different directions. The exposure of capture surfaces 140 is increased by the shape of blades 110, which capture more wind than is deflected, and shed surfaces 180 deflect more air than they capture, therefore typical vertical turbine 100 is forced to turn is the positive direction. However, as long as shed surfaces 180 create momentary or constant capture surfaces in the shed position, an ever-present choking or braking affect is created that reduces the potential of positive forces and directional rotation, limiting the production of power from typical vertical turbine. The transition to more and then less then more negative forces creates the fast and slow pulsing actions of typical vertical turbine 100 in a constant wind speed.

FIG. 2 demonstrates a further drawback of typical vertical turbine 100. Because blades 110 have a single opening for intake and exhaust, vortices 190 form between capture surfaces 140 and also become trapped in between the blades 110 on the opposite side of the turbine from the incoming wind. These vortices 190 force air back out the opening between capture surfaces 140. These vortices 190 diminish the amount of wind entering capture blades 140, thereby reducing the positive impact 160 and overall rotation of typical vertical turbine 100.

Figure 3:
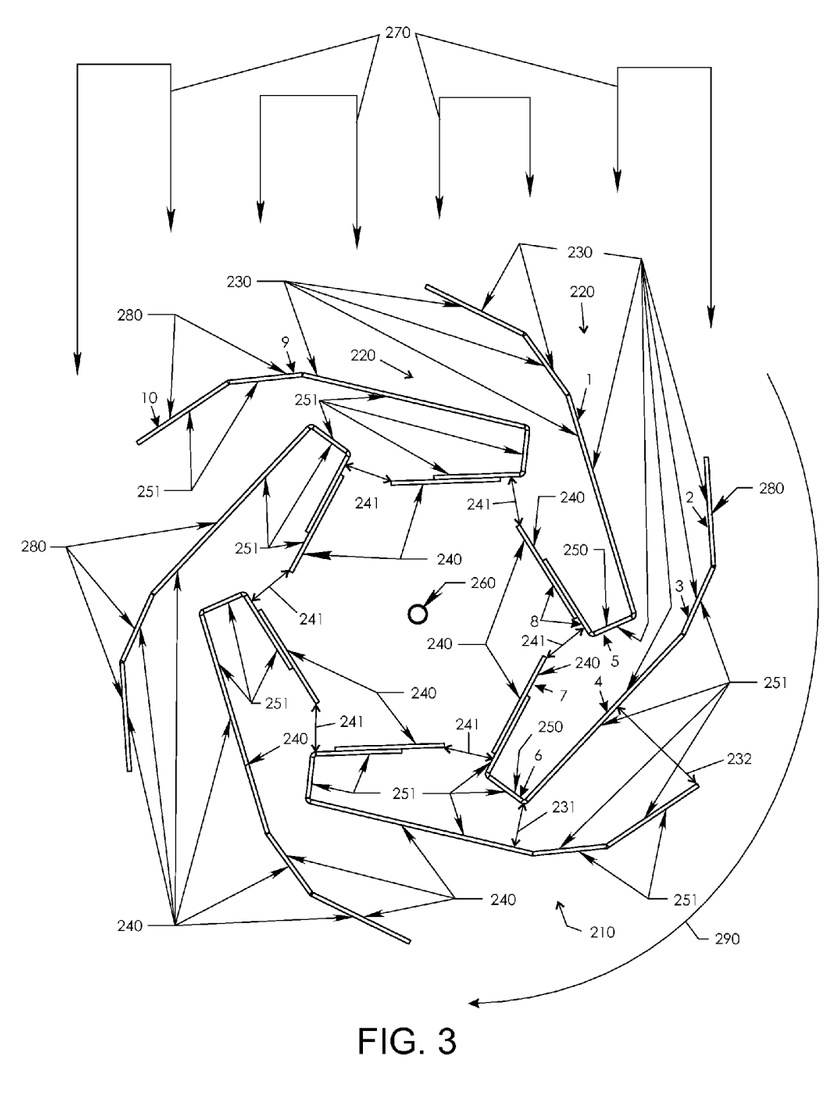
FIG. 3 is a front plan view of a vertical turbine according to the present disclosure.
Figure 4:
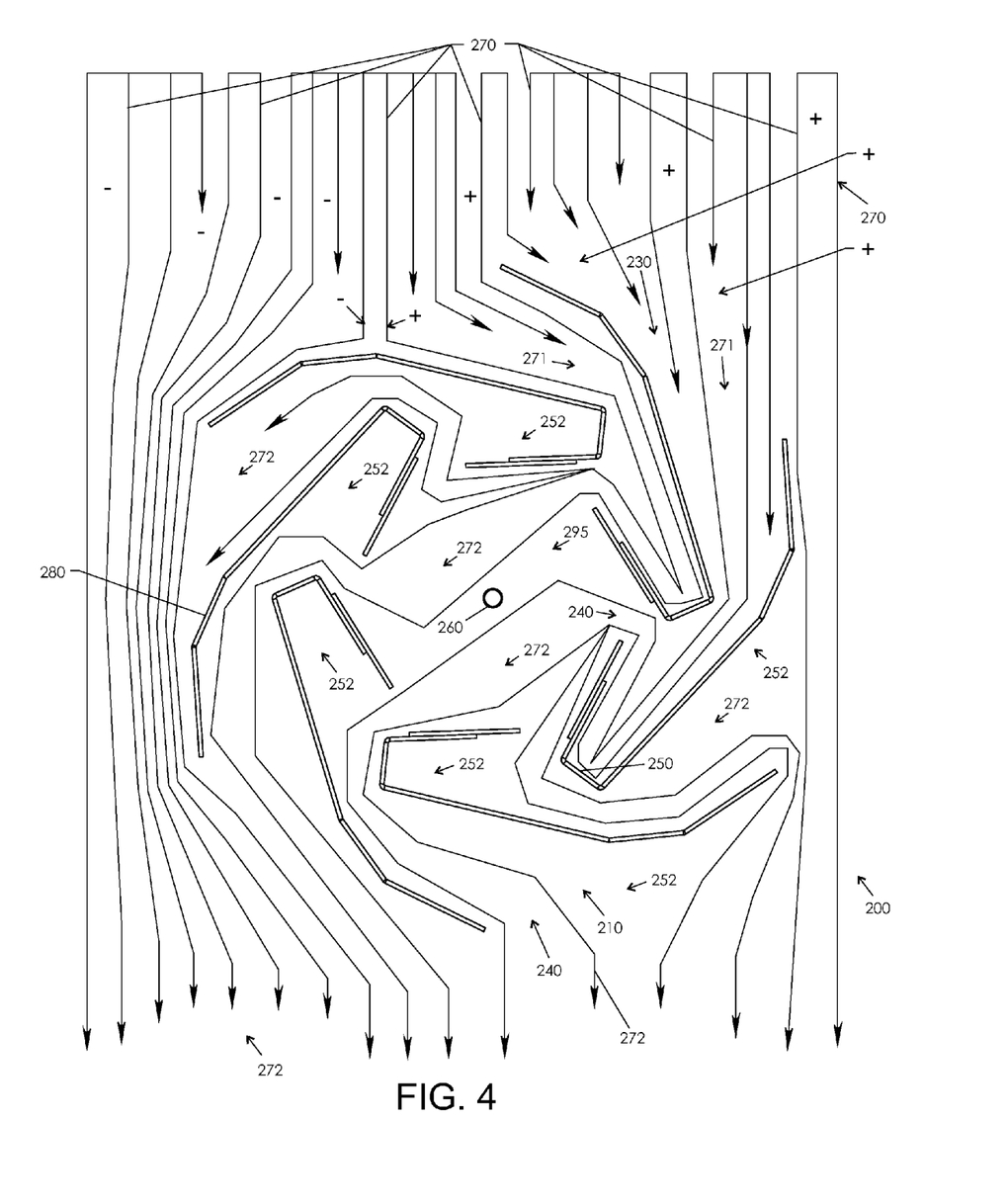
FIG. 4 is a front plan view of the wind path around the turbine of FIG. 3.

FIGS. 3 and 4 depict a wind turbine 200 according to the present disclosure. Blades 210 are shaped to direct incoming wind into channels 220. Channels 220 feature an intake opening 230 and an exhaust opening 240. In between intake opening 230 and exhaust opening 240 is a conversion surface 250. Channels 220 narrow as wind moves from the intake opening 230 to conversion surface 250. As the channel 220 narrows prior to conversion surface 250, the wind speed and velocity is increased. This increase in velocity in turn increases the torque potential on axis 260. Further, by utilizing a channel 220 that has independent intake openings 230 and exhaust openings 241, and by balancing the intake and compression of incoming wind/air with the size and shape of the exhaust opening 240, vortices are not formed within channels 220.

Blades 210 control the intake and exhaust, and therefore the wind flow, through turbine 200 after capture has taken place, thereby reducing and/or eliminating the vortex potential. Wind 270 is captured in channels 220 and turbine 200 converts wind velocity into torque by controlling the path of wind 270 in a forward direction from entry into channel 220 to conversion surfaces 250, which impact and stop the wind 270. The farther away from the axis 260 wind 270 impacts conversion surface 250, the more torque is created to turn axial shaft 260. The impact of wind 270 on conversion surfaces 250 causes turbine 200 to rotate around axis 260. After impact, wind 270 is redirected in a new and controlled direction, exiting channel 220 at exhaust opening 241. It is important not to direct the wind 270 uninterrupted directly to the center axial shaft 260 because doing so will create very little leverage force to turn and rotate the axial shaft 260. The blades not being impacted by the incoming wind 130 have currently neutral surfaces 251, resulting in neutral air 252 in those channels Channel 220 leads to a conversion surface 250 some distance from the axial shaft 260. The angle and direction of wind travel through the channel 220 toward the Conversion surface 250 must be as close to being parallel and concentric to the positive rotational direction of axial shaft 260 as possible. Conversion surface 250 should also be as far from traveling to the axial shaft 260 as possible. Ideally, wind 270 should be directed to be in line with the rotational direction of axial shaft 260 as far away from the center of the axial shaft 260 as possible. Wind 270 should also avoid bisecting the line of rotational direction 290 prior to stopping the wind when it hits the surface of the inside plane 1 2, 3 & 4. The closer the wind is to following the same path as the line of rotational direction 290 outside and around the axis of the axial shaft 260 for the surface of the inside plane 2, 3 & 4, the more impact force and the centrifugal force developed, producing even more additional torque to turn the axial shaft 260, and minimizing the development of drag force on the outside shedding surfaces 280 of turbine 200. The shedding surfaces are comprised of the outside planes 9 & 10 and momentarily part of inside plane 1.

The distance from the axial shaft 260 to conversion surface 250 dictates the rotation speed of turbine 200 at a given wind speed. The farther the distance from the conversion surface 250 to the axial shaft 260, the lower the rotation speed, or the longer it will take to travel/revolve around the conversion surface 250, which causes turbine 200 to move forward and revolve around axial shaft 260. The closer conversion surface 250 is to axial shaft 260, the faster turbine 200 it will travel around axial shaft 260.

Adding the resistance force of the generator shaft will dictate the distance from the axial shaft 260 to conversion surface 250 required to produce enough torque to overcome the resistance force and rotate the generator shaft. The more resistance, the more torque required, and therefore the greater distance from conversion surface 250 to axial shaft 260.

While the distance from conversion surface 250 to axial shaft 260 is initially dictated by the generator resistance, the maximum rotational speed of the generator must also be considered. If enough torque is produced at a given distance from the axial shaft 260, such as 25.4 cm (10 inches), but the rotational speed is too high at an identified top wind speed, then conversion surface 250 can be moved to a greater distance, such as 50.8 cm (20 inches), and the top rotational speed will be decreased at the same wind speed. But if the height of the conversion surface 250 remains the same the torque produced will be higher.

Stated differently, once the rotational speed of turbine 200 is matched to the generator's minimum and maximum rotational speed, the volume of conversion surface 250 must be matched to produce the proper amount of torque desired or required. The volume of conversion surface 250 is determined by the length of conversion surface 250 in the z axis, otherwise known as the height of conversion surface 250.

If the distance of the conversion surface 250 from axial shaft 260 is set to produce the desired maximum rotational speed at a given wind speed, but then does not produce enough torque to overcome the resistance of the generator shaft, then turbine 200 can be made taller by adding one or more sections to tower 300, which will in turn lengthen the conversion surface 250. Lengthening conversion surface 250 increases the volume of wind impacting conversion surface 250, therefore increasing the torque produced at the same set distance from axial shaft 260. The turbine of the present disclosure is designed in such a manner that if it is determined at a later time torque should be increased, additional section(s) may be added on top of the original section without having to replace the original as being deficient. This system can be continually added to, or increased in size, economically. Because of this design feature, the original generator can be replaced with a bigger one with a higher resistant torque without requiring turbine 200 to be replaced. Instead, a section can be added to tower 300 to increase the torque to the generator shaft while maintaining the same diameter turbine 200.

Wind moving at 32.19 kph (20 mph) will impact conversion surface 250, and with no resistance from the generator shaft, will forcibly bring the speed of conversion surface 250 to travel around the rotation distance to an equal rate of 32.19 kph (20 mph). The longer the circumferential distance around the axial shaft, the longer it will take for the conversion surface 250 to make one revolution. For example, 1.61 kph (1 mph) is equivalent to 2,682.24 cpm (1,056 inches per minute). 32.19 kph (20 mph) is equivalent to 53644.8 cm per minute [21,120 inches per minute (ipm)]. A turbine head 200 approximately 50.8 cm (20 inches) in diameter, has a circumference of approximately 159.58 cm (62.828 inches). 32.19 kph [20 mph (21,120 ipm)] divided by 159.58 cm (62.828 inches) equals approximately 336.16 potential rpm at no resistance on the shaft. For example, for a generator that has 120 Ncm of resistance that has to be met to start rotating the shaft, the constant resistance force would reduce (drag/brake)

the potential rpm down to a developed 40 rpm. A different generator with 50 Ncm and the same turbine would develop 130 rpm.

Conversion surface 250 must be of sufficient depth to capture and abruptly stop the wind from traveling in an open curve flowing forward and toward the center axis 260 of turbine head 200 and must abruptly stop and force wind 270 to turn and go in another direction away from center axial shaft 260 to increase and maximize the torque developed. Inside plane 7 must be of sufficient length to create a deep enough cup shape in combination with inside planes 4 & 6 to form conversion surface 250 and to truly change the direction of wind 270 and not allow it to simply flow past the conversion surface 250 with little to no resistance in an open curved line, and must stop and abruptly change the direction of wind 270 to momentarily parallel incoming wind 270 following inside planes 2, 3 & 4 to create maximum torque. Wind 270 must then be directed into decompression chamber 295 where it can then exhaust and exit turbine 200. Wind 270 is then both pressured by the incoming wind 271 and vacuumed out of the decompression chamber 295 through the exhaust openings 241 on the side of turbine 200 opposite capture openings 230. In the decompression chamber 295, the air 272 decompresses in the expanding space. In an exemplary embodiment, the minimal length of plane 7 with the largest exhaust opening should be half the distance from the meeting points of planes 6 and 7 to plane 8 for adjustability of the exhaust opening. In an exemplary embodiment, if the exhaust opening dimension is made static by design then the minimal length for effective conversion would be at least ⅛" at a small scale or small turbine size. It would then become relative to the up scaled size of the turbine head and the volume of air coming into the intake channel. In exemplary embodiment, plane 7 must be a length that would actually force the air to go in a direction parallel to the intake air, or Plane 6 will have to become an acute angle in relationship with plane 4 where they meet.

The vacuum force is created by non-captured wind and shedding wind passing outside and around both sides of turbine 200 that was separated and compressed by impacting the mass of the outside surfaces of turbine 200 that continue to move in the same direction but are suddenly decompressed and expanding on the other side of the turbine 200. This decompression of air on the back side of the turbine 200 is allowed to become vacuum force as wind 270 is permitted to flow into decompression chamber 295 and out the other side freely through balanced channels 220 of air flow to rejoin and mix with wind 270 traveling away from the back of the turbine 200. If the incoming air flow is interrupted or stopped from exhausting at an equal rate to the intake the decompressing air will create a rolling column of dead air on the back side of turbine 200, which creates drag force on the outside planes 9 & 10 slowing the rotation of turbine 200. It should be noted that as turbine 200 rotates the outside planes 9 & 10 transform from shedding surfaces 280 to capture surfaces leading into channels 220 while still being on the incoming wind side of the turbine.

It is ideal that the inside plane 4 and conversion surface 250 meet as flat plains at slightly obtuse angles from each other, creating capture corners that will force wind 270 to stop its forward uninterrupted path and be forced to make an abrupt turn as it impacts and pushes against conversion surface 250 before changing its direction and becoming exhausting wind moving parallel to the incoming wind. If the corners are of too large a radius where they meet the wind will not be forced to abruptly stop its forward direction and push against the bottom of the conversion surface 250 with all its force. Instead, wind 270 will smoothly glance and flow around the axial shaft 260 with minimized torque production as the resistance is lessened by gently curving the winds direction. The more abruptly the wind is actually stopped by inside plane 6 and forced to turn and change direction to exhaust into decompression chamber 295, the more torque generated.

The inside plane 6 of the conversion surface 250 must be at an angle turning back toward the inside plane 4 of the Capture Channel Surface 4 and must be more than approximately 3.18 mm (0.125 inches) to redirect the flow of air and cause the air to crash up against and push forward against inside plane 6 forcing the rotation of the inside plane 6 around the axial shaft 260 producing torque. As the scale of turbine 200 is enlarged the required surface of the inside plane 6 must increase. Ideally the inside plane 6 must be equal to equal to the distance between inside plane 4 and the meeting corner of inside planes 1 & 5.

Wind 270 enters into channel 220 and is directed by the surfaces of outside planes 1, 2, 3, 4 and 5 to impact into the surface of inside plane 6 forcing the wind to push inside plane 6 forward under pressure. Wind 270 is then redirected abruptly to turn 90 degrees or more and move along the inside plane 7 away from inside plane 6 and through exhaust opening 241 between the open end of the inside plane 7 and the inside plane 8 and into the decompression chamber 295.

If wind is not allowed to exhaust at an equal rate as the intake of air into channel 220, vacuum force will be created on the back outside of turbine 200. The vacuum force will drag against the outside planes 9 & 10 on the opposite side of the turbine 200 and create resistance to positive rotation of turbine 200, reducing the torque produced. Controlling the volume of air allowed to exhaust into and out of the decompression chamber 295 by closing or restricting the exhaust opening 240 allows a reduction or increase in the torque generated. Ideally the narrowest dimension of channel 220 is the intake dimension measured between the inside plane 4 and the meeting corner of inside planes 1 & 5, which compresses the incoming air. The intake dimension should be equal to the dimension between the face of inside plane 8 and the edge created where inside planes 7 & 8 meet, creating exhaust opening 241 into decompression chamber 295.

Outside planes 9 & 10 can be pivoted at the meeting point of the outside plane 1 & 9 to open and close the capture opening 230 by moving toward the inside plane 1 of an adjacent blade 210 that creates and begins the capture opening 230. By moving the outside planes 9 & 10 closer to the inside plane 1 of an adjacent blade 210, the amount of wind 270 allowed to enter channel 220 and impact the inside surface plane 6 is reduced, reducing the rotation and torque potential of turbine 200. By adjusting the non-pivoting end of the outside planes 9 & 10 to touch inside plane 1 of an adjacent blade 210, wind 270 is prevented from entering channel 220. Further, these adjustments create an exterior shape of turbine 200 that will not allow turbine 200 to turn in the wind at any wind speed, which shuts down the generator with no braking mechanism. As capture opening 230 is decreased, the amount of air that will be compressed at the Intake Dimension 231 is decreased, decreasing the accelerated speed of the wind impacting conversion surface 250 and decreasing the produced torque up to the point that the Entrance Dimension 232 is equal to the Intake Dimension. If the Entrance Dimension 232 becomes less than the Intake Dimension, wind entering channel 220 will begin to decompress immediately, lowering the wind speed in the channel 220 to be less than the outside wind speed and immediately decreasing the torque produced. Thus, decreasing the entrance dimension provides another method to control the rotational speed of turbine 200 without a braking mechanism.

The opening and closing of the entrance dimension to the channel 220 allows for manual, automatic, or remote reduction of air flow into channel 220, which in turn provides regulation of the rotational speed of the generator regardless of the wind speed. Ultimately, the rotation potential of the generator can be stopped completely. Automated controls are also able to immediately respond to the changing wind speeds, allowing the rotation speed of turbine 200 to remain constant as the wind speeds go up and down, creating more voltage/watt leveling controls. The same automated controls can be used to open and close the Exhaust Dimension 241 by moving doors 240 controlling both the rotational speed and torque production of turbine 200.

The narrowing of channel 220 compresses wind 270 as it enters intake opening 230, increasing the velocity of wind 270 before impacting the torque converting surfaces 250. Exhaust opening 240, which can be static or adjustable, maximizes or reduces torque with control. An adjustable exhaust opening 240 allows for control in both the start up speed and the maximum rotation of turbine 200 without braking. A balanced intake and exhaust channel produces no vortex effect in the channel, but reducing the size of exhaust opening 240 creates a controllable vortex affect in channel 220, which reduces the amount of air allowed to enter intake opening 230 of channel 220, which directly affects the amount of torque produced. The exhaust opening 240 is reduced, the larger the vortex affect created within channel 220. The vortex affect creates back pressure in channel 220, causing air that has already entered channel to push backwards and begin exhausting out intake opening 230. The exhausting wind creates a barrier to intake opening 230, causing wind 270 to travel around and past intake opening 230. The reduction in wind 270 entering channel 220 in turn reduces the impact on conversion surface 250, which reduces the rotation of turbine 200. By decreasing the size of exhaust opening 240 to be less than that required for balance intake and exhaust air flow, rotational speed of the turbine head is decreased. This is due to the resistant force of the generator connected to the axial shaft 260, which pushes in the opposite direction of the positive rotational direction of turbine 200.

Intake opening 230 is also adjustable, either manually or automatically. Controlling the size of intake opening 230 controls the amount of wind 270 that is allowed to enter channel 220 and impact conversion surfaces 250, thereby controlling the torque produced, regardless of the wind speed. As the size of intake opening 230 is reduced, the inside of channel 220 begins to compress less air as it travels through channel 220, decreasing the wind velocity traveling through channel 220 and therefore the impact on conversion surfaces 250, and thus producing less torque. Eventually channel 220 will stop compressing air and begins to decompress air as channel 220 becomes larger than intake opening 230. As air begins to decompress, the wind velocity in channel 220 is decreased and the impact force of wind 270 on conversion surface 250 is decreased, thereby reducing the torque produced by turbine 200. Intake opening 230 can be reduced to the point that there is not enough torque produced to turn against the generator's resistant force, stopping all rotation. Intake opening 230 can be closed entirely to take a shape that produces no capture surfaces on either side of turbine 200, capturing no wind and producing no torque and completely neutralizing turbine 200 from turning in either direction.

Intake openings 230 and exhaust openings 240 can be reduced and closed at varying degrees to each other manually or automatically to produce varying amounts of torque and energy production at any external wind speed, making the torque production of turbine 200 adjustable. This adjustable feature can be controlled automatically by the external wind speed. For example, if the external wind speed increases to a speed that is determined to be too high for the capacity of the generator, the controls will automatically reduce the intake openings 230 and/or exhaust openings 240 to reduce the amount of wind captured and channeled through turbine 200, maintaining a safe rotation speed for turbine 200 and guarding the generator from harm. The controls can also be programmed to monitor changing wind speeds and constantly make adjustments to the intake openings 230 and exhaust openings 240 to maintain a more constant rotation of turbine 200. This adjustability reduces dependence on external wind speed for rotational and torque potential from turbine 200.

The configuration of blades 210 on turbine 200 sheds wind not being captured or forced into channels 220. This is accomplished by overlapping blades 210 and creating a closed design of turbine 200. The overlap of blades 210 creates a larger constant percentage of capture directed wind and air flow into channels 220 than there is shedding surface 280 at any given position of the turbine 200 rotation around axis 260. The shape of blades 210 creates a large area of captured wind that is converted into torque to the axial shaft 260. The shape and angles of the blade surfaces minimize the potential forces that shedding wind may have on trying to spin the turbine head in the opposite direction than the captured winds. There are much fewer moments of neutral air, where equal influence is present in the capture direction and the shedding direction than typical vertical shaft turbines. Blades 210 are angled in such a manner that anytime wind 270 impacts the blades 210 on the shed side 280, the surfaces deflect the wind, creating no surface angle that could interface with the incoming wind to create opposing forces against the desired direction of rotation.

The components discussed supra maximize and control the conversion of raw wind force to torque. Torque is the amount of positive wind force being captured versus the wind force that contacts the shed surfaces 280 on the opposite side of the turbine 200 axis during rotation that escapes conversion but creates a negative force trying to rotate turbine 200 in the opposite direction desired and required for positive torque production. The disclosed turbine 200 optimizes the torque to the generator or alternator shaft. The disclosed turbine 200 also addresses noise pollution. The captured wind flow of air moving through the turbine 200 in a single direction, in addition to shed surfaces 280 which do not create any negative capture surfaces, thereby avoiding impact surfaces moving toward or against the external wind direction, produces little concussion. Further, the disclosed turbine 200 allows the wind to travel easily into channels 220 on the capture side and easily flow around and outside the shed surfaces 280, which drastically reduces the audible whirl sounds commonly associated with other turbines. The closed but effective appearance of a turbine 200 according to the present disclosure should dissuade birds from attempting to fly through blades 210. Additionally, the external design of turbine 200 can be modified to compliment the surrounding environment, such as by powder coating turbine 200 to blend into the existing environment.

To start turning the generator and produce electricity, the applied force (torque) of the turbine most become greater than the resistant force of the generator. The greater the applied force (torque) the faster the rotational speed of the axial shaft 260 connected to the generator and therefore converted into more electrical power produced per hour. The higher the rotational speed of turbine 200, the higher the kilowatt output of the generator.

With no resistant force from the generator shaft coupled to the axial shaft 260, the balanced surface of the inside plane 6 will eventually reach a forward speed along the concentric path around the diameter of the axial shaft 260 that is equal to the wind speed. Because of this, the line of rotational direction of turbine 200 must be considered when matching the requirements of a particular generator with the diameter size of turbine 200, which is determined by the distance of the center of the inside plane 6 from the center of the axial shaft 260. Turbine 200 will not rotate any faster than the speed of the wind equal to the number of centimeters per second the wind is traveling and the surface of the inside plane 6 is moving along the path of the line of rotational direction. So if the wind is moving 25.4 cm per second (10 inches per second), the center of the inside plane 6 will travel 25.4 cm per second (10 inches per second) along the line of rotational direction, regardless of the diameter of the line of directional rotation. The larger the diameter, the longer the circumference of the line of rotational direction. The longer the distance around the line of rotational direction the lower the rotation at a given wind speed. A smaller diameter line of rotational direction with a short distance around the circumference would have a higher rotation factor. If a generator has an optimal rotations per minute (rpm) requirement of 250 and you have wind speeds of 32.187 kilometers per hour (kph) (20 miles per hour) (mph), the proper diameter/circumference is one where the inside plane 6 will make 250 rotations in one minute. If it is only doing 200 rpm at 32.187 kph (20 mph), then you will have to decrease the diameter of the line of rotational direction until the desired rpm is matched.

If at 32.187 kph (20 mph) the inside plane 6 is traveling at the proper rate to do 250 rpm with no resistant force from the generator shaft, and resistance is added to the shaft, the diameter of the line of rotational direction must be decreased to compensate for the loss of speed and rpm of turbine 200 due to the generator. In that case, the wind may be moving at 32.187 kph (20 mph) but it is only able to push the inside plane 6 around its concentric path at a rate of 24.14 kph (15 mph). Because of the smaller distance the inside plane 6 has to travel to make a full rotation around axial shaft 260 turbine 200 is still able to produce 250 rpm. Therefore, the larger the diameter of turbine 200, the lower the rpm requirement for the generator should be. The higher the rpm requirement for the generator, the smaller the diameter turbine 200 required. To increase torque at any given diameter to equal that of the resistant force of the generator you must add surface area height to the inside plane 6 which is conversion surface 250. This allows more wind to impact the larger inside plane 6 and convert to more torque and reach the desired rpm potential at that given diameter.

If the exhaust opening 240 is adjusted to be less than the width of the channel 220 intake dimension as discussed above, you lower the top speed potential and rpm's of the turbine 200. In this case, wind 270 cannot flow freely into decompression chamber 295 and begins to back up and create back pressure force, opposing the wind that is entering channel 220 thereby decreasing the amount of wind 270 that can be allowed into channel 220. Applied force is produced against the inside plane 6 to overcome the resistant force of the generator shaft. Creating the ability to open and close exhaust opening 240 creates an automatic over spin protection for the generator, because the faster the wind speeds into channel 220, the more back pressure is created by the redirected wind from the conversion surface 250. This wind cannot exhaust into the decompression chamber 295 and out of the turbine 200 and instead is forced to travel back out channel 220 into and against the incoming air. Eventually the back pressure will becomes great enough that most of is deflected past the opening of the channel 220. At that point turbine 200 will only spin at an rpm rate that allows wind 270 to continue to enter into channel 220 and maintain it maximum rpm potential. So, if turbine 200 is rotating 320 rpm at 72.4 kph (45 mph) wind speed when this point of diminishing return is met the turbine 200 will continue rotating at the same rate of 320 rpm at 104.6 kph (65 mph) and so on. Thus, if a generator has a maximum over spin rpm rating of 350 the exhaust opening 240 will control the back pressure to only allow the turbine 200 to rotate a maximum of 320 rpm. To achieve a higher maximum rpm the exhaust opening 240 is increased. To achieve a lower maximum rpm the exhaust opening 240 is decreased.

If the exhaust opening 240 is closed completely, the wind speed required to start turning the generator shaft against it relative resistant force is increased. For example, if the exhaust opening 240 is opened to its ideal setting, it will begin to overcome an 84 Newton resistant force of the generator shaft with wind speeds of only 3.2 to 4.8 kph (2 to 3 mph), producing electrical power while at the same time raising the maximum rpm potential of turbine 200 in high wind speeds. If the exhaust opening 240 is closed completely 40.23 kph (25 mph) wind speeds may be required to begin to overcome the same 84 Newton resistant force of the generator shaft while at the same time lowering the maximum rpm potential of the turbine 200 in the same high wind speeds.

The controllable exhaust opening 200 matched to the surface area or height of the inside plane 6 creates the ability to select and match average winds speeds to the proper start up speed of the turbine and the maximum rpm rating of the generator.

The torque point of the disclosed turbine is consistently the same distance from the axial shaft regardless to the position of the turbine head producing a steady constant rpm and level of voltage or kilowatt power output, unlike typical vertical shaft turbines that the torque point move in and out from the center of the axial shaft going to it maximum torque potential, to zero torque to the shaft, back to its max and then back t zero and so on, which creates a voltage or kilowatt wave of pulsing power output from the generator in addition to the reverse torque conflicts of the typical blade shapes and configurations.

The disclosed turbine can be used to produce energy underwater with the same results from its geometry and controls. Fluid moving into the turbine follows the same path as air, but the fluid produces even greater forces when impacting conversion surface 250, creating much more torque at lower incoming fluid speeds.

Figure 5:
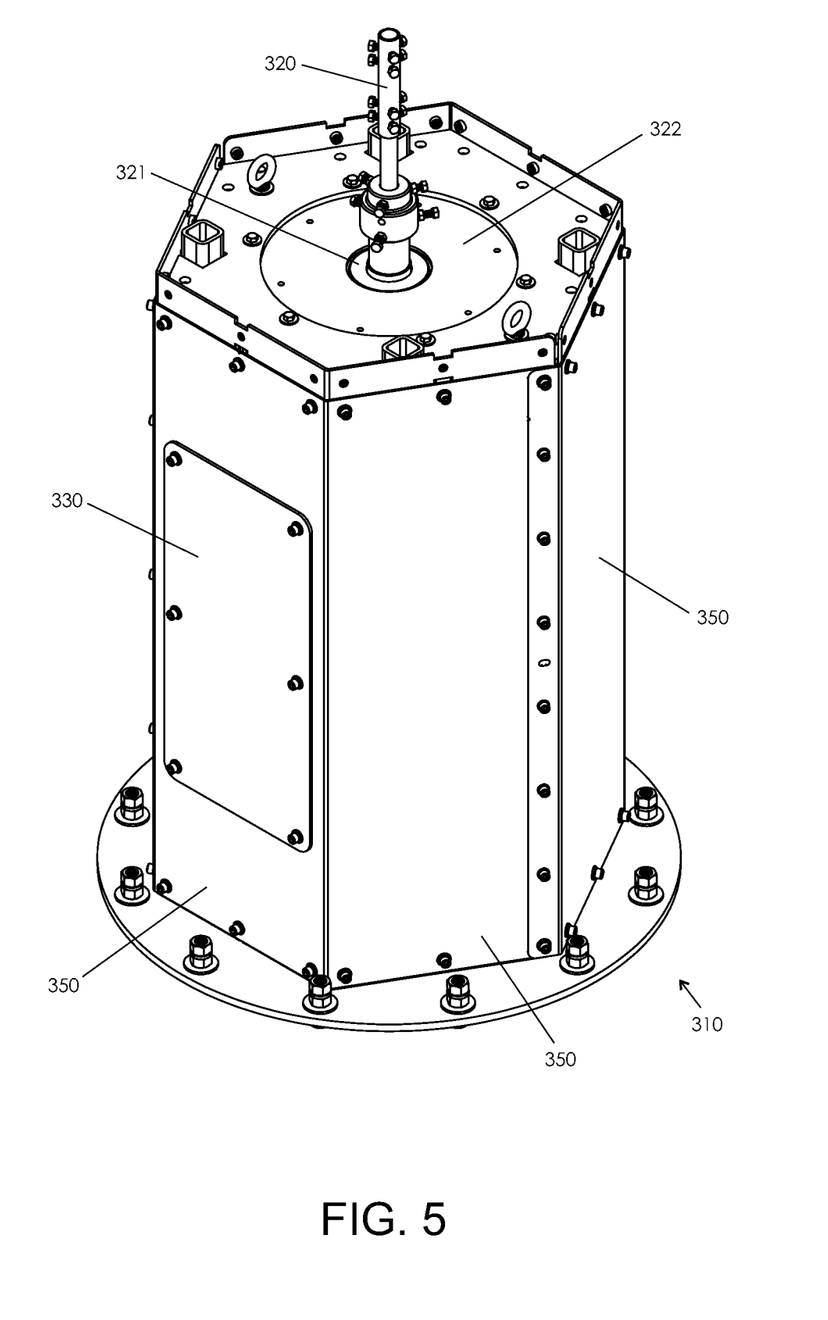
FIG. 5 is a perspective view of the base section of a tower according to the present disclosure.

Turning next to FIGS. 5-8, a hexagonal tower 300 for mounting a turbine is disclosed. It should be appreciated that the tower may be a variety of shapes in addition to a hexagon. In the depicted embodiment, the shape is a hexagonal shape. A reason for the hexagonal shape is the scale or diameter of the turbine head dictating the number of blades that would fit around the circumference of the turbine head used. More blades can be inserted within the circumference. In one embodiment a minimum of 6 produces smoothest wave lengths of energy. Another embodiment removes extra material stuck outside the connecting lines from the outside edge from blade to blade. Another embodiment is round. It may be appreciated that the more the turbine head weighs the more energy it takes to start it rotating. It may be desirable to have the lowest wind speed to start rotation overcoming the resistant force of the generator. The depicted hexagonal shape is achieved by attaching, for example, by bolting or welding panels 350 together. The number of bolts may be dependent on what is required to withstand the forces of the wind it may experience. In an exemplary embodiment, the sections may be made of aluminum. Bolting or welding may be a production preference. In an exemplary embodiment the panels may be 111.76 cm (44 inches) in length, but it is understood that they may also be any length including a range of 121.9 cm (48 inches) or less. Turning first to FIG. 5, tower 300 includes base 310. Base 310 is designed to house a generator or alternator at ground level for ease of maintenance and for ease of replacement. Base 310 includes base panel cover 330, through which the generator 321 or alternator can be accessed. A generator axle shaft 320 protrudes from the approximate center of the top of base 310 out of generator plate 322. Base 310 is modular. If and when conditions in electrical demands increase, the generator or alternator can be changed in size with ease as the bottom plate of the tower has a universal bolt pattern. This allows for a wide array of different makes and models of generators/alternators. In the depicted embodiment, base 310 is approximately 72.47 cm (28.53 inches) wide at its widest point. In the depicted embodiment, base 310 is approximately 113.67 cm (44.75 inches) tall. In the depicted embodiment, generator axle shaft is approximately 38.53 cm (15.17 inches) tall. In the depicted embodiment, base panel cover 330 is approximately 30.48 cm (12 inches) wide and approximately 60.96 cm (24 inches) tall. In the depicted embodiment, the internal angle formed between adjacent attached panels 350 is approximately 120°. One having an ordinary level skill in the art will understand that the depicted measurements are merely exemplary and can be adjusted based upon numerous factors.

Figure 6:
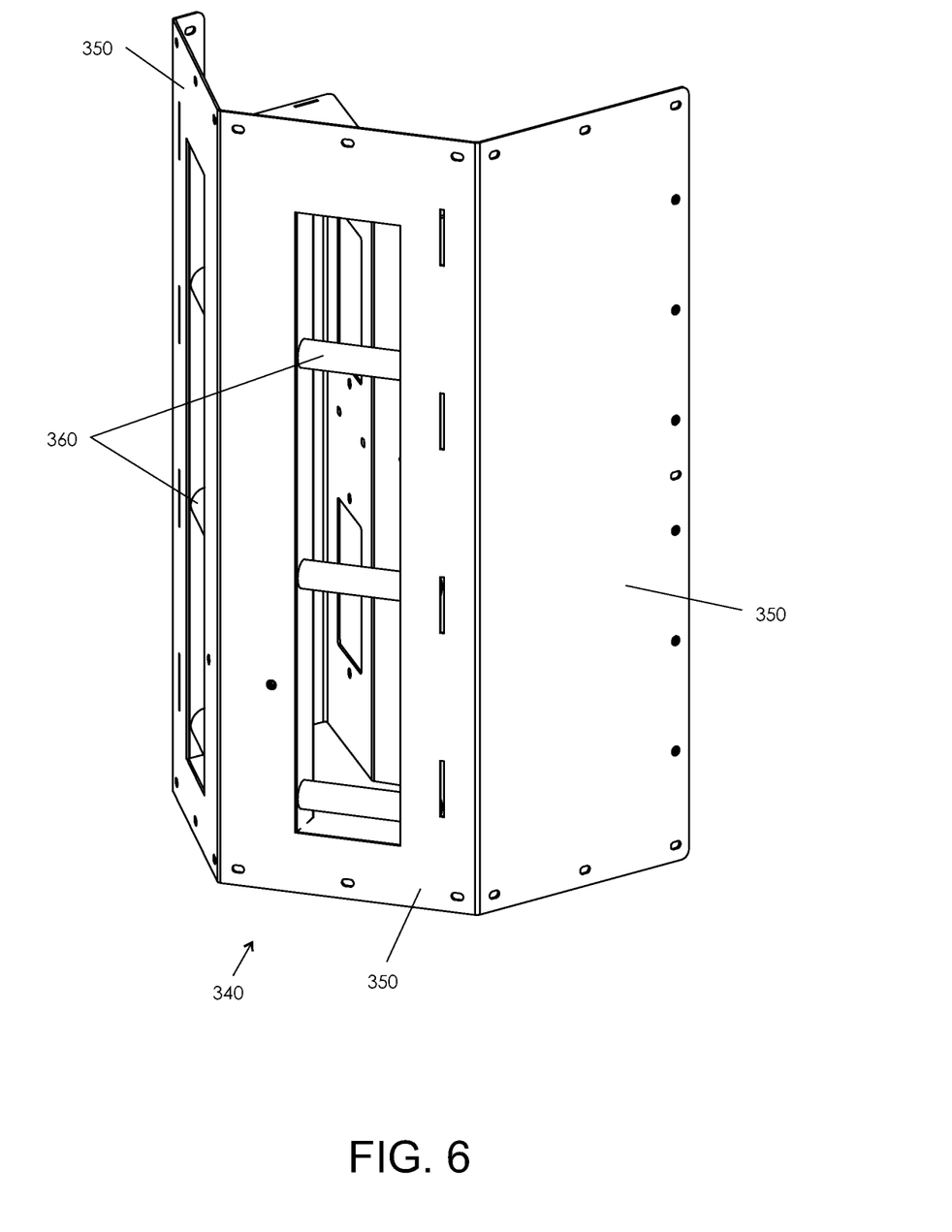
FIG. 6 is a perspective view of the middle section of a tower according to the present disclosure.

Turning next to FIG. 6, a middle section 340 of tower 300 is shown. Middle section 340 is hexagonal, and is comprised of six attached panels. At least one panel 350 includes a ladder 360. The modularity of tower 300 can be increased or decreased in height by adding or removing sections 340. Tower 300 is designed to retrofit solar panels. Ladder 360 is optional. A door 370 may be included to enclose ladder 360 when not in use. Door 370 can be locked to control access. In the depicted embodiment, middle section 340 is approximately 71.98 cm (28.34 inches) wide at its widest point. In the depicted embodiment, middle section 340 is approximately 106.68 cm (42 inches) tall. The width of the base and the middle sections may be equivalent to each other or they may be different. One having an ordinary level skill in the art will understand that the depicted measurements are merely exemplary and can be adjusted based upon numerous factors.

Figure 7:
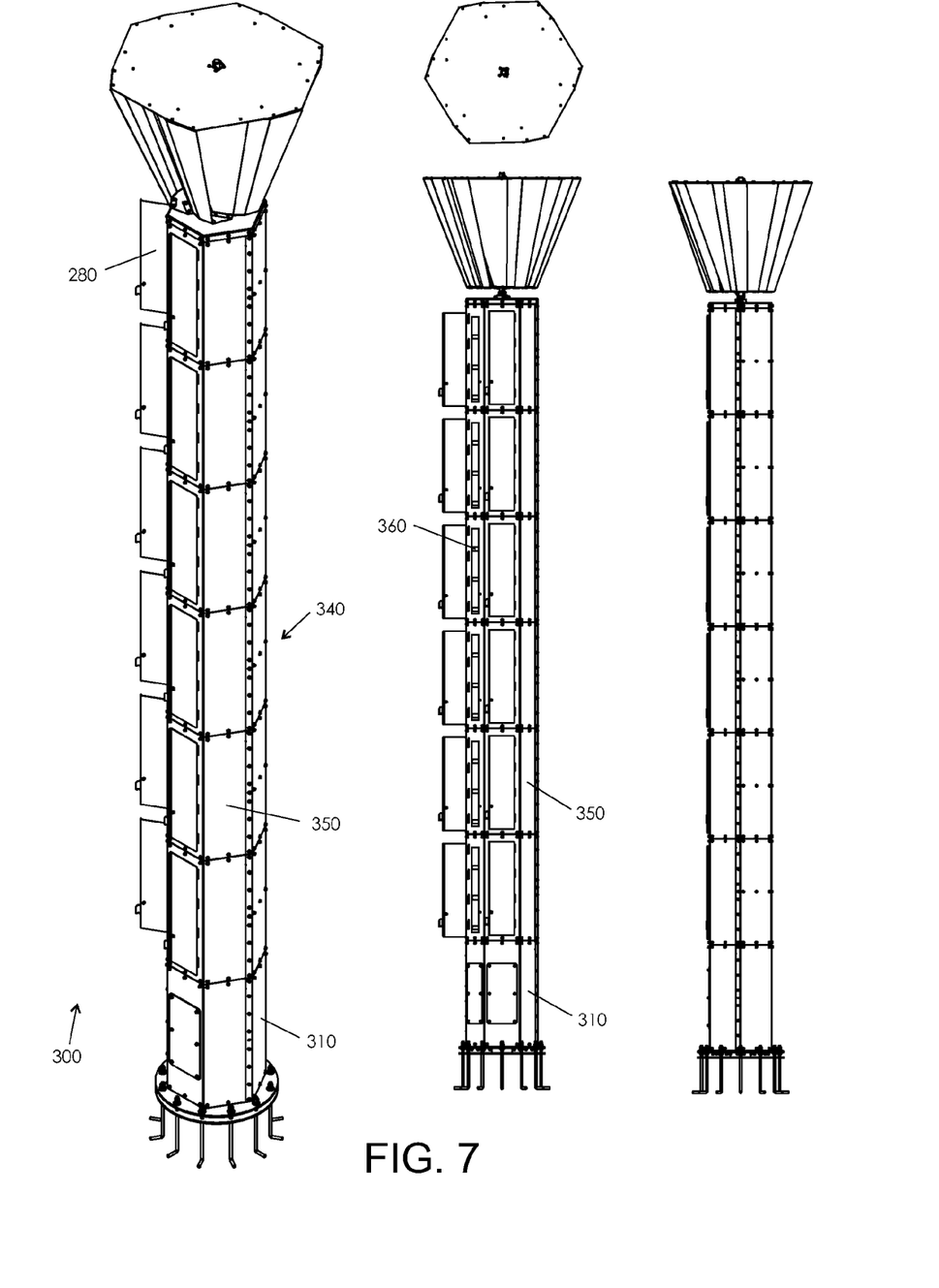
FIG. 7 is a perspective view of a tower according to the present disclosure.
Figure 8:
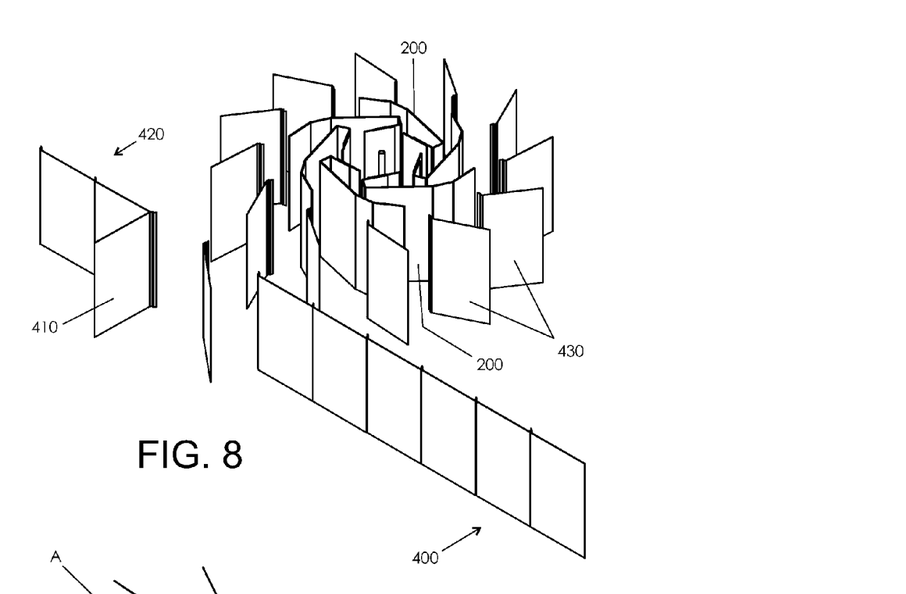
FIG. 8 is a perspective view of a vertical wind amplifier and turbine according to the present disclosure.
Figure 9:
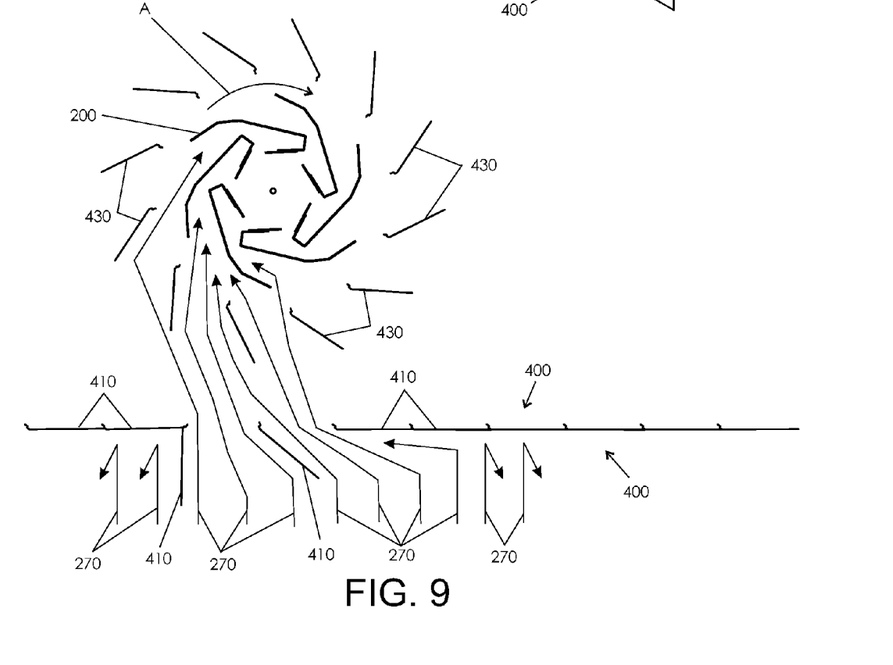
FIG. 9 is a top plan view of a vertical wind amplifier and turbine according to the present disclosure.
Figure 10:
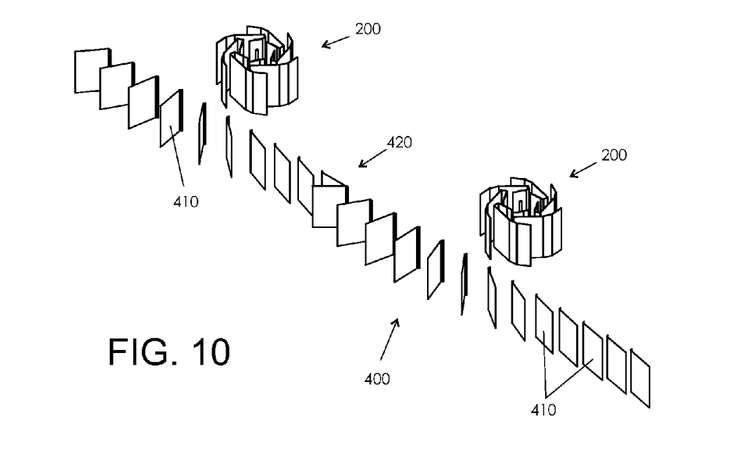
FIG. 10 is a perspective view of a second embodiment of a vertical wind amplifier and turbine according to the present disclosure.
Figure 11:
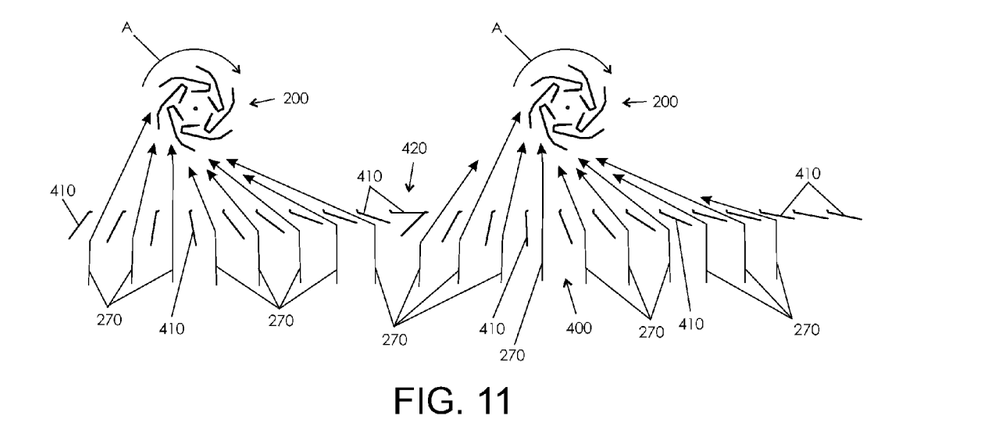
FIG. 11 is top plan view of a second embodiment of a vertical wind amplifier and turbine according to the present disclosure.

FIG. 7 depicts an assembled tower 300 according to the present disclosure. Tower 300 is designed to be assembled in sections that can allow the owner to determine the overall height per the owner's property characteristics instead of a predetermined height the may exceed local or state regulations. It also saves the owner the expense of a tower that is taller than required to produce the desired energy. The tower's section design allows the tower height to grow or shrink according to the future requirements of the property or environment. For example, if trees or structure near the tower grow in height the tower can simply be extended when desired with additional sections. This tower can also be complimentary to the surrounding environment by the powder coating selected by the end user.

Turning finally to FIGS. 8 through 11, a wind directional amplifier 400 is shown. The wind directional amplifier 400 directs the flow of wind 270 to the optimum location for capture surfaces of the turbine 200. A series of wind directional amplifiers 400 may be placed in front of a turbine 200, forming a "wall". A wind directional amplifier 400 can also be made a part of a tower 300, depending on the individual application requirements. The wall configuration can be constructed to amplify multiple turbines at the same time. The individual wind directional amplifier panels 410 can be moved to focus more or less air flow to one or more turbines 200, thereby selectively controlling the output of the all the turbines collectively. Wind directional amplifiers 400 also allow turbines 200 to be placed within a building or structure instead of on or around it, while controlling air flow to the turbines 200, increasing the power generated or shutting the turbine(s) 200 down. This wind directional amplifier 400 is stationary and has adjustable louvers that can alter the amount of wind force to turbine 200 based on ambient conditions. The louvers can be manually controlled or electronically manipulated to increase or decrease the rotation speed of turbines 200 and torque generated therefrom, and can ultimately be used to maintain a constant rotation speed and torque regardless of the outside wind speeds. The louvers can be closed to shut off all air flow to turbine 200, stopping the turbine 200 completely, regardless of the outside wind speeds. The wind directional amplifier 400, too, can be profiled (externally shaped) and powder coated to compliment the surroundings. Single louvers 430 can be placed in radially spaced configuration around the turbine 200 as well.

The inside or exhaust side 420 of the wind directional amplifier 400 can be filtered with a screening material to protect turbine 200 from impact from flying debris or wildlife, as well as creating a safety barrier that does not allow unauthorized access into the turbine area for people or animals. Depending on the filtering material used, there would be little to no slowing of the wind speed on the exhaust side of the amplifier. Examples of filtering material include but are not limited to screens made of metal or plastic. It is desirable for the filaments to not be too thick which may cause them to begin to restrict air flow. In exemplary embodiments, the mesh is at least 10 times the thickness of the filaments. In other exemplary embodiments the mesh may be at 20 times or greater. In other exemplary embodiments the opening of the screen is no bigger than 2.54 cm (1 inch). A less than 2.54 cm opening may be a deterrent for keeping birds out of the turbine. In some embodiments, the opening may be kept small, especially when positioned close to the ground to deter to small pets and children from the turbine chamber area. In other embodiments, bigger may be better. Alternatively, the filtering material can be used to reduce the amount of air allow passing through the amplifier and the wind speeds that reach and enter the turbine(s) 200.

It should be appreciated that the turbine heads may be stacked on top of each other. In an exemplary embodiment additional heads can be added onto existing heads to potentially increase torque production. For example, it may be desirable to increase the KW size of the generator which would increase the resistant force of the generator on the shaft requiring higher wind speeds to overcome the resistant force and begin to rotate the turbine head. The ability to add additional heads may also increase the torque produced at the same wind speed without increasing the diameter and footprint of the turbine. An exemplary embodiment of the invention may be expandable. An exemplary expandable embodiment of the invention may not require an entire system to be replaced if more energy is desired or required later. An exemplary expendable embodiment of the invention may bolt together or attach by other means additional turbine heads at the top and bottom of each other relatively.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Whenever a range is given in the specification, all intermediate ranges and subranges, as well as all individual values included in the ranges given are intended to be included in the disclosure.

In general the terms and phrases used herein have their art-recognized meaning, which can be found by reference to standard texts, journal references and contexts known to those skilled in the art. The above definitions are provided to clarify their specific use in the context of the invention.

The invention claimed is:

1. A wind turbine comprising:
a plurality of blades spaced apart mounted radially around a center axis of rotation, the blades configured such that there is an open center space around the center axis of rotation;
a plurality of channels formed between adjacent blades;
each of said channels have an intake opening and a separate exhaust opening, the exhaust opening venting into the open center space;
each of said blades having a first blade section having a first end and a second end and a body of the blade extending there between, a conversion surface attached to the second end for the first blade section at an obtuse angle, the conversion surface extending between the first blade section and a second blade section, the second blade section extending from the conversion surface to a first side of the exhaust opening;
the joining of the first blade section, second blade section and the conversion surface forming a cup shape;
a second side of the exhaust opening being defined by the second blade section of an adjacent blade;
the blade configured such that an air current flows out of the exhaust opening after impacting the conversion surface and into the center space;
some of the air current flowing out of the turbine through at least one the remaining of the plurality of channels after passing through the open space;
wherein the channels narrow between the intake opening and the conversion surface, compressing and accelerating an air flow; and
wherein a widest width of the exhaust opening equals the length of the conversion surface.

2. The turbine of claim 1 further comprising:
a mounting tower comprising:
a base section comprising an interior space to house a desired piece of equipment;
a plurality of substantially identical middle sections;
said base section and middle sections being adapted to attached together to form a tower of a desired height with the vertical wind turbine.

3. The turbine of claim 1 further comprising:
a wind directional amplifier comprising:
a series of adjustable directional amplifier panels;
said adjustable directional amplifier panels functioning to direct air currents either toward or away from a vertical axis wind turbine as desired.

4. The turbine of claim 1, wherein a width of the narrowest point of the channels equals a widest width of the exhaust opening.

5. The turbine of claim 1, further comprising at least one generator shaft connected to the vertical axis wind turbine such that the rotation of the turbine rotates the generator shaft, thereby generating energy.

6. The turbine of claim 1, wherein a distance from the axial shaft to the conversion surface is selected to produce enough torque to overcome a resistance force of the generator shaft and thereby rotate the generator shaft.

7. The turbine of claim 1, wherein a width of the intake opening can be adjusted.

8. The turbine of claim 7, wherein the intake opening can be completely closed by moving a section of the blade.

9. The turbine of claim 8, wherein the exhaust opening can be completely closed by moving the second section of the blade.

10. The turbine of claim 1, wherein a width of the exhaust opening can be adjusted.

11. The turbine of claim 10, wherein the exhaust opening can be completely closed by moving the second section of the blade.

12. The turbine of claim 1, wherein the angle between the conversion surface and the second blade section is 90 degrees or more.

13. The turbine of claim 12, wherein the second side of the exhaust opening is located at the angle between the second blade section and the conversion surface of the adjacent blade.

14. The turbine of claim 1, wherein the first blade section of a given blade overlaps the first blade section of an adjacent blade.

15. The turbine of claim 1, wherein a second vertical axis turbine can be stacked on top of a first vertical axis turbine to increase the torque created.

16. The turbine of claim 1, wherein the turbine is a vertical axis wind turbine.

17. The turbine of claim 1, wherein the channels between the blades are concentric to the rotational direction of the axis of rotation.

18. A wind turbine comprising:
a plurality of blades spaced apart mounted radially around a center axis of rotation, the blades configured such that there is an open center space around the center axis of rotation;
a plurality of channels formed between adjacent blades;
each of said channels have an intake opening and a separate exhaust opening, the exhaust opening venting into the open center space;
each of said blades having a first blade section having a first end and a second end and a body of the blade extending there between, a conversion surface attached to the second end for the first blade section at an obtuse angle, the conversion surface extending between the first blade section and a second blade section, the second blade section extending from the conversion surface to a first side of the exhaust opening;
the joining of the first blade section, second blade section and the conversion surface forming a cup shape;
a second side of the exhaust opening being defined by the second blade section of an adjacent blade;
the blade configured such that an air current flows out of the exhaust opening after impacting the conversion surface and into the center space;

some of the air current flowing out of the turbine through at least one the remaining of the plurality of channels after passing through the open space; and wherein a width of the exhaust opening can be adjusted, by changing the length of the second blade section.

19. The turbine of claim 18 further comprising:
a mounting tower comprising:
a base section comprising an interior space to house a desired piece of equipment;
a plurality of substantially identical middle sections;
said base section and middle sections being adapted to attached together to form a tower of a desired height with the vertical wind turbine.

20. The turbine of claim 18 further comprising:
a wind directional amplifier comprising:
a series of adjustable directional amplifier panels;
said adjustable directional amplifier panels functioning to direct air currents either toward or away from a vertical axis wind turbine as desired.

21. The turbine of claim 18, wherein the channels narrow between the intake opening and the conversion surface, compressing and accelerating an air flow.

22. The turbine of claim 21, wherein a width of the narrowest point of the channels equals a widest width of the exhaust opening.

23. The turbine of claim 18, further comprising at least one generator shaft connected to the vertical axis wind turbine such that the rotation of the turbine rotates the generator shaft, thereby generating energy.

24. The turbine of claim 18, wherein a distance from the axial shaft to the conversion surface is selected to produce enough torque to overcome a resistance force of the generator shaft and thereby rotate the generator shaft.

25. The turbine of claim 18, wherein a width of the intake opening can be adjusted.

26. The turbine of claim 25, wherein the intake opening can be completely closed by moving a section of the blade.

27. The turbine of claim 26, wherein the exhaust opening can be completely closed by moving the second section of the blade.

28. The turbine of claim 18, wherein the exhaust opening can be completely closed by moving the second section of the blade.

29. The turbine of claim 18, wherein the angle between the conversion surface and the second blade section is 90 degrees or more.

30. The turbine of claim 29, wherein the second side of the exhaust opening is located at the angle between the second blade section and the conversion surface of the adjacent blade.

31. The turbine of claim 18, wherein the first blade section of a given blade overlaps the first blade section of an adjacent blade.

32. The turbine of claim 18, wherein a second vertical axis turbine can be stacked on top of a first vertical axis turbine to increase the torque created.

33. The turbine of claim 18, wherein the turbine is a vertical axis wind turbine.

34. The turbine of claim 18, wherein the channels between the blades are concentric to the rotational direction of the axis of rotation.

* * * * *